Dec. 19, 1950            E. T. HAECKER            2,534,594
AXIALLY SHIFTING TYPE HYDRAULIC TIRE
MOUNTING AND DEMOUNTING DEVICE
Filed Jan. 16, 1946            2 Sheets-Sheet 2
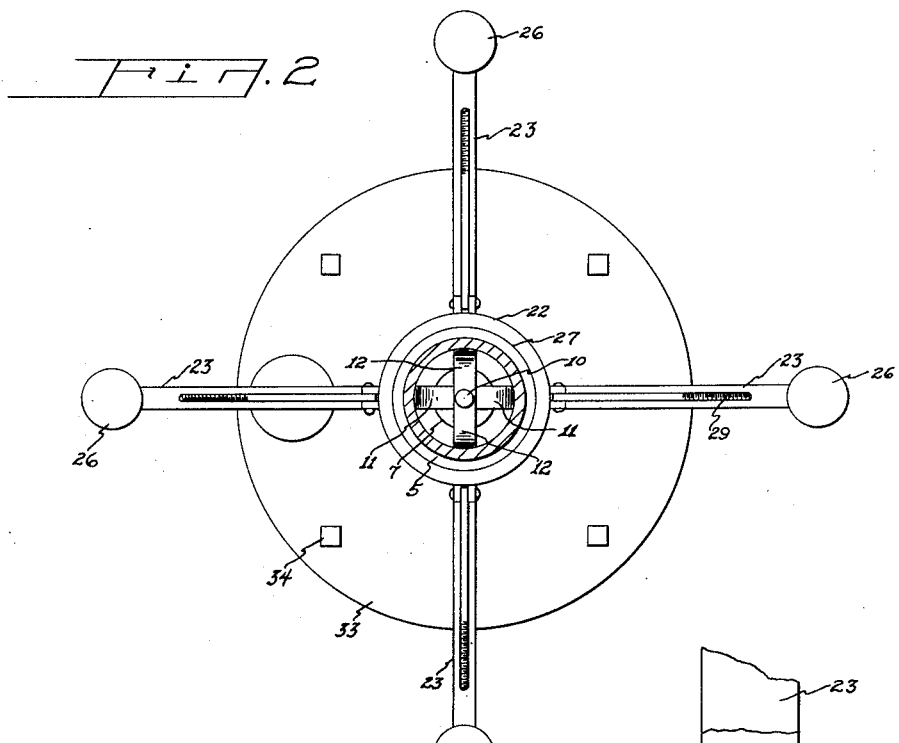
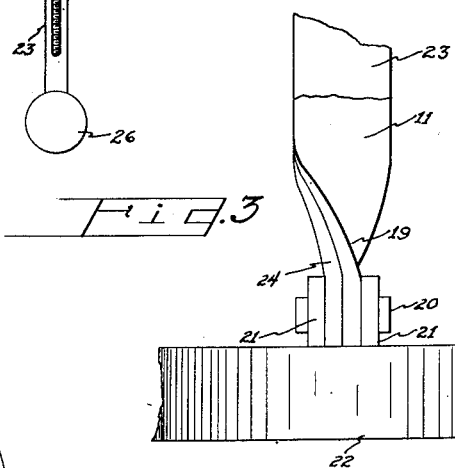
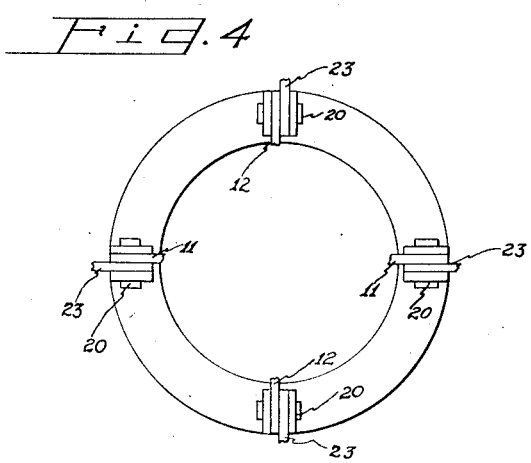
INVENTOR.
Edward T. Haecker
BY
Smith & Wells
Attys

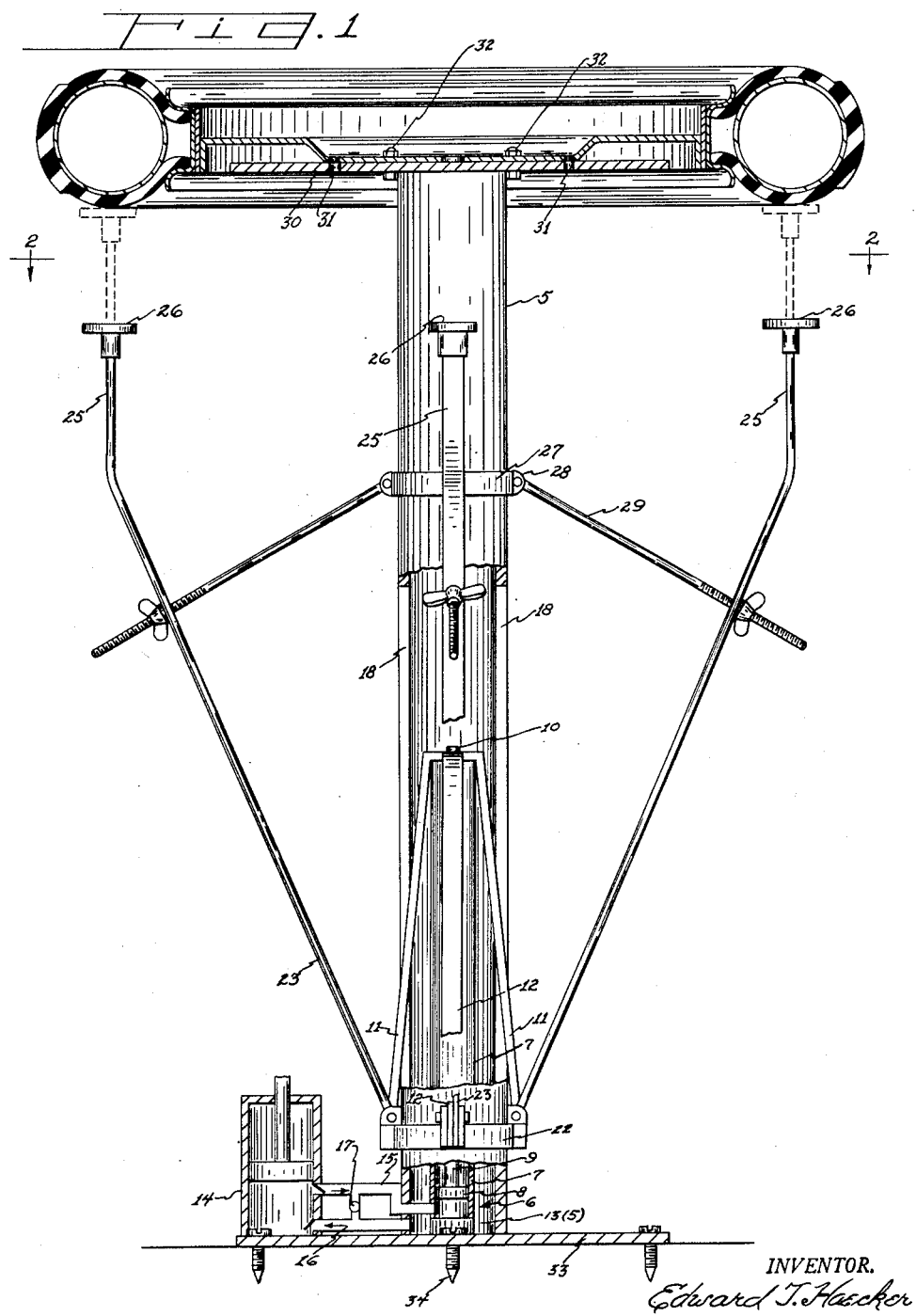

UNITED STATES PATENT OFFICE 2,534,594

AXIALLY SHIFTING TYPE HYDRAULIC TIRE MOUNTING AND DEMOUNTING DEVICE

Edward T. Haecker, Hope, Idaho

Application January 16, 1946, Serial No. 641,567

1 Claim. (Cl. 157—1.2)

My invention relates to improvements in an axially shifting type hydraulic tire mounting and demounting device and has for its principal object the provision of a tire press of this character which is novel in construction with the parts so arranged that the operation in forcing a tire into place on a wheel or in dismounting a tire from a wheel.

The press is particularly adapted to use in forcing the tire bead from the rim of the wheel without injury to the tire and then forcing the tire off the wheel. The device is not applicable to drop center wheels however and should not be used to mount tires on such wheels. Tires often become rusted and stuck to the rim of the wheel. In trying to break the tire loose the service man hammers the tire and may seriously injure it. With my tire press which is simple to operate this injury is avoided and a saving of time is effected. Owing to the simplicity of operation a saving of time is also effected in mounting tires.

It is also a purpose of my invention to provide a novel tire press construction embodying a central column of tubular form such as a section of pipe, with all of the essential elements, except parts of the hydraulic jack, mechanism mounted on the column and easily adapted to tire mounting, tire tread releasing, and tire removing.

The nature and advantages of my invention will appear more fully from the following description and the accompanying drawings wherein a preferred form of the invention is shown. It should be understood, however, that the drawings and description are illustrative only and that they should not be considered as limiting the invention except insofar as it is limited by the claim.

In the drawings:

Figure 1 is a vertical sectional view through a hydraulic tire press embodying my invention;

Figure 2 is a horizontal sectional view taken substantially on the line 2—2 of Figure 1;

Figure 3 is a fragmentary detail view illustrating the mounting of left arms and tire supporting arms upon a guide collar of the press and Figure 4 is a plain view of the guide collar with its mountings for the arms.

Referring now in detail to the drawings the details of the construction of a press embodying my invention will be described. The main supporting and guiding element of the press comprises a center column 5 of suitable hollow steel tubing of adequate diameter. In the base of this column 5 is a lift unit 6 of a hydraulic jack. The lift unit comprises a cylinder 7, a piston 8, a piston rod 9, and lift head means 10, on the upper end of the rod 9 to secure a plurality of lift arms 11—11 and 12—12 to the rod. Preferably the lower end of the column 5 is utilized to provide a reservoir 13 for hydraulic fluid. A pump 14 (shown diagrammatically) is connected to discharge fluid under pressure to the cylinder 7 through a pipe 15, and to draw its supply of fluid from the reservoir 13 through a pipe 16. A relief valve 17 is provided for relieving the pressure in the cylinder 7 to allow the lift head to drop by returning the fluid to the reservoir 13 through the pipe 16. In actual construction the relief valve and the pump 14 will be positioned for convenient access by the operator. Any suitable pump or hydraulic jack may of course be utilized.

The lift arms 11—11 and 12—12 extend out through four vertically extending slots 18 in the wall of the column 5. These slots are long enough to take the full stroke of the lifting unit 6. The lift arms are steel bars with their lower ends twisted as shown at 19 in Figure 2 to lie in a radial plane with respect to the column 5. These twisted lower ends are secured by bolts 20 to ears 21—21, that are provided on a guide collar 22 that encircles the column 5 and is slidable vertically thereon.

A plurality of tire supporting arms 23 are pivotally secured at their lower ends by the bolts 20. These arms 23 are also twisted as shown in Figure 2 at 24. They are made of steel bar stock or equivalent material. The arms 23 are circumferentially spaced about the column 5 and the lower portions diverge as they extend upwardly. Each arm 23 has a top portion 25 bent at an angle to the main lower portion thereof so as to extend substantially vertically. The top portions 25 are provided with tire engaging pads 26.

A second collar 27 is fixed on the column 5. This collar has ears 28 thereon to which links 29 are pivotally secured. The links extend downwardly and outwardly at substantially right angles to the diverging lower portions of the arms 23 and pass through apertures in the arms. The links are threaded throughout a substantial portion of their length and receive wing nuts so as to adjustably position the arms 23 to engage different size tires at the proper place. The links also perform the additional function of bracing the arms 23 to prevent their bending outward when pressure is applied to push a tire upward.

A steel plate 30 is welded to the top of the column 5 to mount the wheels thereon. This plate has a number of holes 31, therein positioned to receive bolts 32 at different diameters for securing wheels of different sizes and types of construction to the plate. The base of the column 5 preferably is welded to a base plate 33 which is mounted on the service station floor by log screws 34.

In using the press the arms 23 are normally in lowered position so that a tire can be placed thereon below the level of the plate 30. The wheel is bolted to the plate 30 by three bolts 32 and then the tire is raised to force it on the wheel by using the jack to raise the lift arms 11—11 and 12—12. As these arms move up they raise the collar 22 and thus raise the arms 23. The arms are held against outward movement by the links 29 and the collar 27. When the tire is lifted the links 29 can swing about their pivots and always prevent the arms 23 from moving outward.

Having thus described my invention, I claim:

A tire press comprising a base plate, a hydraulic pump mounted on the base plate, a tubular column removably mounted on the base plate, a wheel mounting plate attached to the top of the column, vertical, longitudinal guide slots in the tubular column, a hydraulic cylinder within the base of said column and being connected to said pump, a piston within said cylinder, a piston rod extending from said cylinder and constituting a lifting post, a lower collar slidably positioned around, and an upper collar fixed to, the tubular column, a plurality of connecting links pivotally attached to the lower collar and extending upwardly through the said guide slots in the column to an attachment on the upper extremity of the said lifting post positioned within the tubular column, lifting arms pivotally connected to the lower collar and extending upwardly and outwardly from the said lower collar and terminating at the point of engagement with a tire on a wheel bolted to the said wheel mounting plate, tire engaging members fitted to the upper ends of the said lifting arms, threaded adjusting and supporting links pivoted to the uppermost collar and extending outwardly through the respective lifting arms, and adjusting nuts on said links for holding the arms against outward movement.

EDWARD T. HAECKER.

REFERENCES CITED

The following references are of record in the file of this patent:

UNITED STATES PATENTS

| Number | Name | Date |
|---|---|---|
| 1,375,332 | Stephens | Apr. 19, 1921 |
| 1,552,928 | Hershon | Sept. 8, 1925 |
| 1,575,869 | Schmidt | Mar. 9, 1926 |
| 1,641,083 | Hite | Aug. 30, 1927 |
| 1,890,746 | O'Dell | Dec. 13, 1932 |
| 2,401,118 | Talley et al. | May 28, 1946 |
| 2,416,195 | Mitchell | Feb. 18, 1947 |
| 2,464,638 | Falkner | Mar. 15, 1949 |